UNITED STATES PATENT OFFICE.

EDWARD ROCHE, OF PROVIDENCE, RHODE ISLAND.

COMPOSITION FOR SHOE-MAKERS' WAX.

SPECIFICATION forming part of Letters Patent No. 440,762, dated November 18, 1890.

Application filed June 26, 1890. Serial No. 356,882. (Specimens.)

*To all whom it may concern:*

Be it known that I, EDWARD ROCHE, of Providence, in the county of Providence, State of Rhode Island, have invented certain new and useful Improvements in Composition Substitute for Shoe-Makers' Wax, of which the following is a description sufficiently full, clear, and exact to enable any person skilled in the art or science to which said invention appertains to make and use the same.

My invention relates especially to a composition for treating thread for sewing leather, and is designed particularly as a substitute for shoe-makers' wax.

The composition is composed of the ingredients combined substantially in the proportions set forth in the following formula: pure gum-rubber, one-fourth ounce; fir balsam, one-half ounce; cannabine or extract of hemp, one-fourth ounce; benzine, six ounces. The extract of hemp is dissolved to a thin liquid with the benzine, to which the balsam of fir is added. The rubber is then thoroughly mixed into the composition. The extract of hemp with the fir balsam restrains the evaporation of the benzine, retaining the mass in a semi-liquid state and preventing it from becoming hard when exposed to the air. Said ingredients are also found to counteract the effect of the benzine on the flax or thread.

The composition is preferably contained in a box in which perforations are formed, through which the thread may be run to receive the wax substitute.

The composition as thus formed imparts great strength to the thread and renders it practically water-proof, which prevents it from rotting and the thread breaking easily in the manufactured article. Moreover, thread prepared by my improved composition can be used with sewing-machines of the ordinary construction without the aid of heat, which is ordinarily employed where the thread is prepared with wax in the usual manner. The thread being thus always flexible and the absence of heat avoiding all expansion or contraction, the work is much more easily sewed and rendered much more durable.

I do not confine myself to employing fir balsam, as any resinous substance that can be readily dissolved and has an affinity for the gum-rubber may be used.

Having thus explained my invention, what I claim is—

1. A composition for the purposes described, comprising gum-rubber or rubber cement, cannabine, and a resinous substance, combined substantially in the proportion specified.

2. A composition substitute for shoe-makers' wax, composed of gum-rubber or rubber cement, fir balsam, cannabine or extract of hemp, and benzine, compounded substantially as specified.

EDWARD ROCHE.

Witnesses:
JOHN DORAN,
JOHN WALMSLEY.